(12) United States Patent  (10) Patent No.: US 7,148,431 B2
Pyron  (45) Date of Patent: Dec. 12, 2006

(54) ARMORED CABLE CONNECTOR (75) Inventor: Roger Pyron, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/137,951

(22) Filed: May 26, 2005

(65) Prior Publication Data
US 2005/0269122 A1 Dec. 8, 2005

Related U.S. Application Data (60) Provisional application No. 60/577,737, filed on Jun. 7, 2004.

(51) Int. Cl.
H02G 3/18 (2006.01)

(52) U.S. Cl. ............ 174/656; 174/660; 174/662; 174/667; 174/668; 248/56; 16/2.1

(58) Field of Classification Search ........ 174/65 R, 174/51, 65 G, 135, 656, 660, 662–669; 248/56; 16/2.1, 2.2; 439/98; 285/194
See application file for complete search history.

(56) References Cited

U.S. PATENT DOCUMENTS

| | | | |
|---|---|---|---|
| 2,869,905 A | 1/1959 | Bratz | |
| 3,221,572 A | 12/1965 | Swick | |
| 3,858,151 A * | 12/1974 | Paskert | 439/98 |
| 4,012,578 A | 3/1977 | Moran et al. | |
| 4,156,103 A | 5/1979 | Dola et al. | |
| 4,619,332 A * | 10/1986 | Sheehan | 174/65 R |
| 4,880,387 A | 11/1989 | Stikeleather et al. | |
| 4,990,721 A * | 2/1991 | Sheehan | 174/65 R |
| 5,204,499 A | 4/1993 | Favalora | |
| 5,342,994 A | 8/1994 | Pratesi | |
| 5,373,106 A | 12/1994 | O'Neil et al. | |
| 6,034,326 A | 3/2000 | Jorgensen | |
| 6,114,630 A | 9/2000 | Gretz | |
| 6,380,483 B1 | 4/2002 | Blake | |
| 6,596,939 B1 | 7/2003 | Gretz | |

* cited by examiner

Primary Examiner—Dhiru R. Patel
(74) Attorney, Agent, or Firm—Hoffmann & Baron, LLP (57) ABSTRACT A cable connector terminates an armored cable in a knock-out in a wall of an electrical enclosure. The connector includes a one-piece connector body having a forward end and plurality of side walls extending from the forward end in cantilevered fashion to define a cavity for receipt of an end of the cable. The forward end of the connector body is insertable into the knockout and the cantilevered side walls are deflectable to permit such insertion. The side walls further accommodate insertion of a cable into the cavity for retentively supporting the cable to the enclosure. The side walls of the connector body include outwardly extending tabs for engaging wall of the enclosure about the knockout. Side walls further include inwardly extending fingers for engaging the cable.

21 Claims, 14 Drawing Sheets

ARMORED CABLE CONNECTOR

CROSS-REFERENCE TO RELATED APPLICATIONS

This application claims priority to U.S. Provisional Application No. 60/577,737, filed Jun. 7, 2004.

FIELD OF THE INVENTION

The present invention relates generally to a connector for terminating the end of an electrical cable. More particularly, the present invention relates to a one-piece connector for connecting a flexible armored cable to a knockout of an electrical enclosure.

BACKGROUND OF THE INVENTION

An electrical wire is typically terminated in a junction box, panel box or other electrical enclosure. The wire enters the enclosure through an opening referred to as a knockout in a wall of the enclosure. In order to terminate the wires in the enclosure, an end of a conduit (cable) which encloses the wires is attached to the enclosure at the knockout.

Not only are cable connectors of this type manufactured to effect electrical engagement between the conduit and the electrical enclosure, these connectors should also provide strain relief attachment of the cable to the enclosure. Thus, when a load placed on the cable, tending to pull the cable out from the enclosure is applied, the connector should adequately resist such a load and maintain the cable in mechanical and electrical engagement with the enclosure.

The art has seen a wide variety of connectors and termination devices used to attach the conduit to the knockout of the electrical enclosure. Certain of these connectors are specifically designed for attaching flexible metallic armored conduits. These connectors also serve to effect electrical engagement between the conduit and the electrical enclosure. Examples of such conduit connectors are shown in, among others, U.S. Pat. Nos. 3,858,151; 4,012,578; 4,021,604; 4,619,332; 4,990,721; 6,034,326; and 6,114,630.

While each of these devices serve adequately for their intended purposes, there is a need for a conduit connector which allows ease of insertion and attachment to the knockout of the electrical enclosure and which securely retains the conduit to the enclosure. Moreover, it is desirable to employ a conduit connector which is simple and cost effective to manufacture and assembled. Additionally, it is desirable to provide a conduit connector which permits the subsequent insertion of the conduit into the connector after the connector has been attached to the enclosure.

SUMMARY OF THE INVENTION

The present invention provides a cable connector for terminating an end of a cable to a knockout of an enclosure. The connector includes a one-piece connector body having a forward end and plurality of side walls extending rearwardly from said forward end in cantilevered fashion to form a cavity for receipt of an end of the cable. The forward end of the connector body is insertable into the knockout with the cantilevered side walls being deflectable to permit retentive insertion thereinto. The side walls further accommodate insertion of the cable end into the cavity for retentively supporting the cable to the enclosure.

The side walls may further include outwardly extending tabs for engagement with the enclosure about the knockout. Additionally, the side walls may include inwardly extending fingers for engaging the cable, especially flexible armored cable.

The present invention also provides a method for terminating an end of a cable to a knockout of an enclosure. A connector body having a forward end including a plurality of side walls extending from the forward end in cantilevered fashion is provided. The connector body defines a cavity. The forward end of the connector body is inserted into the knockout with the side walls deflecting to permit the insertion. Thereafter, the cable end is inserted into the cavity of the connector body in order to retentively support the cable to the enclosure.

DETAILED DESCRIPTION OF THE PREFERRED EMBODIMENT

The present invention provides an electrical connector 10 which is used to terminate a cable 12 to a knockout 14 in a wall 16 of an electrical enclosure 18. In the present illustrative embodiment, connector 10 is used to terminate a flexible armored cable 12 which includes a helical groove 12a thereabout to enhance flexibility. The armored cable 12 supports a plurality of electrical wires (not shown) therethrough for termination within the electrical enclosure 18.

Figure 1:
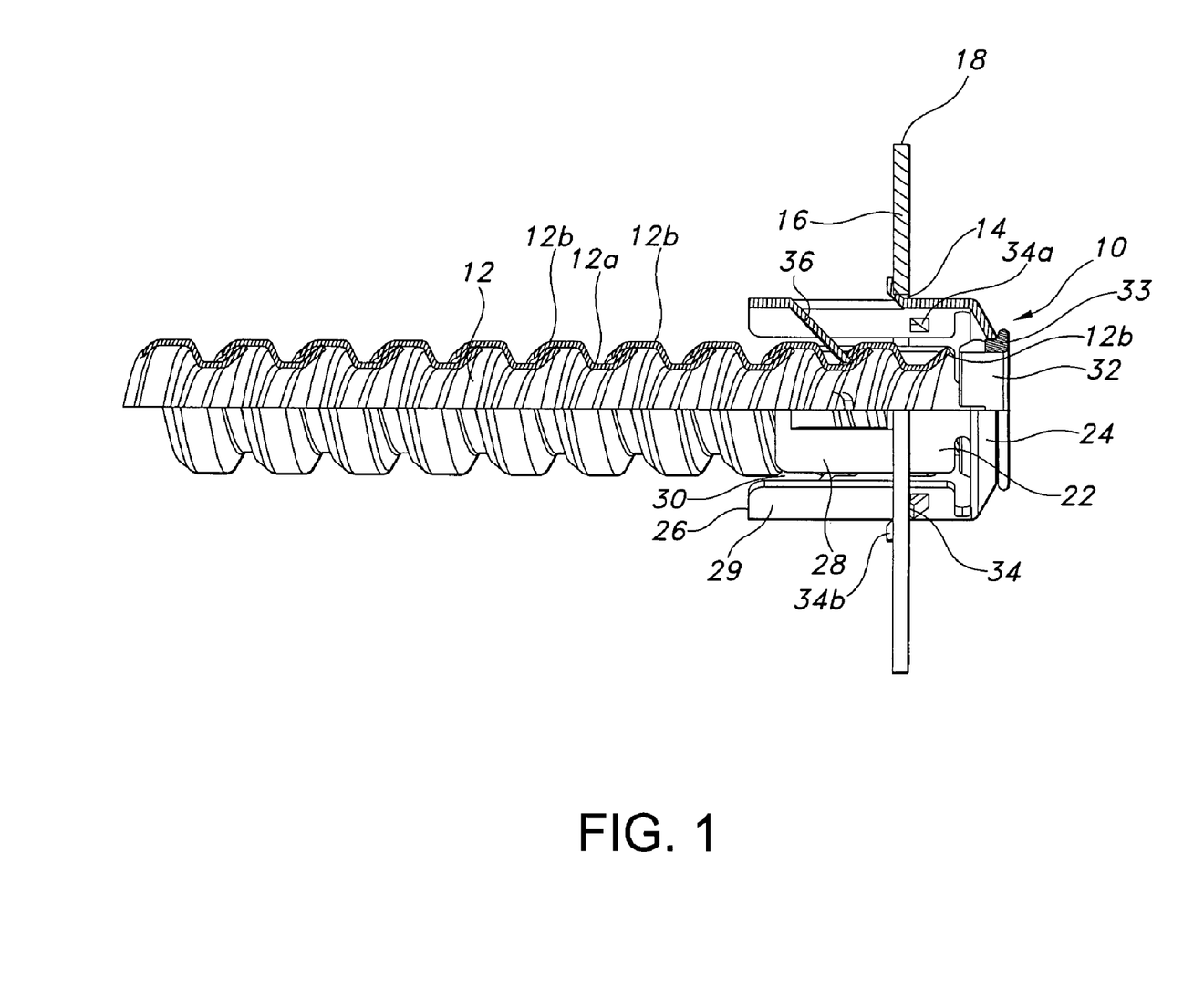
FIG. 1 is a side elevational showing, partially in section, of the connector of the present invention terminating an armored cable to an electrical enclosure.

As is generally shown in FIG. 1, connector 10 includes a connector body 22 having a forward end 24, an opposed open rearward end 26 and a generally cylindrical wall 28 extending therebetween defining a connector interior 30 for accommodating end 12b of cable 12. The forward end 24 of connector 10 includes a central opening 32 for passage of electrical wires (not shown) of cable 12 therethrough. An insulative throat 33 may be applied to forward end 24 as is well known. As will be described in further detail hereinbelow, the connector 10 includes a plurality of outwardly extending tabs 34 which engage the walls 16 of enclosure 18 to secure the connector thereto. The extending tabs 34 include front tabs 34a and rear tabs 34b which engage either side respectively of wall 16 of enclosure 18. Connector 10 further includes a plurality of inwardly directed fingers 36 which engage the helical groove 12a of cable 12 to secure the cable to the connector. The connector 10 is preferably formed of a suitably conductive metal so that electrical continuity is established between armored cable 12 and the wall 16 of enclosure 18. The inwardly extending fingers 36 and the outwardly extending tabs 34 assist in establishing such electrical continuity.

The manufacture of the connector of the present invention may now be described.

Figure 2:
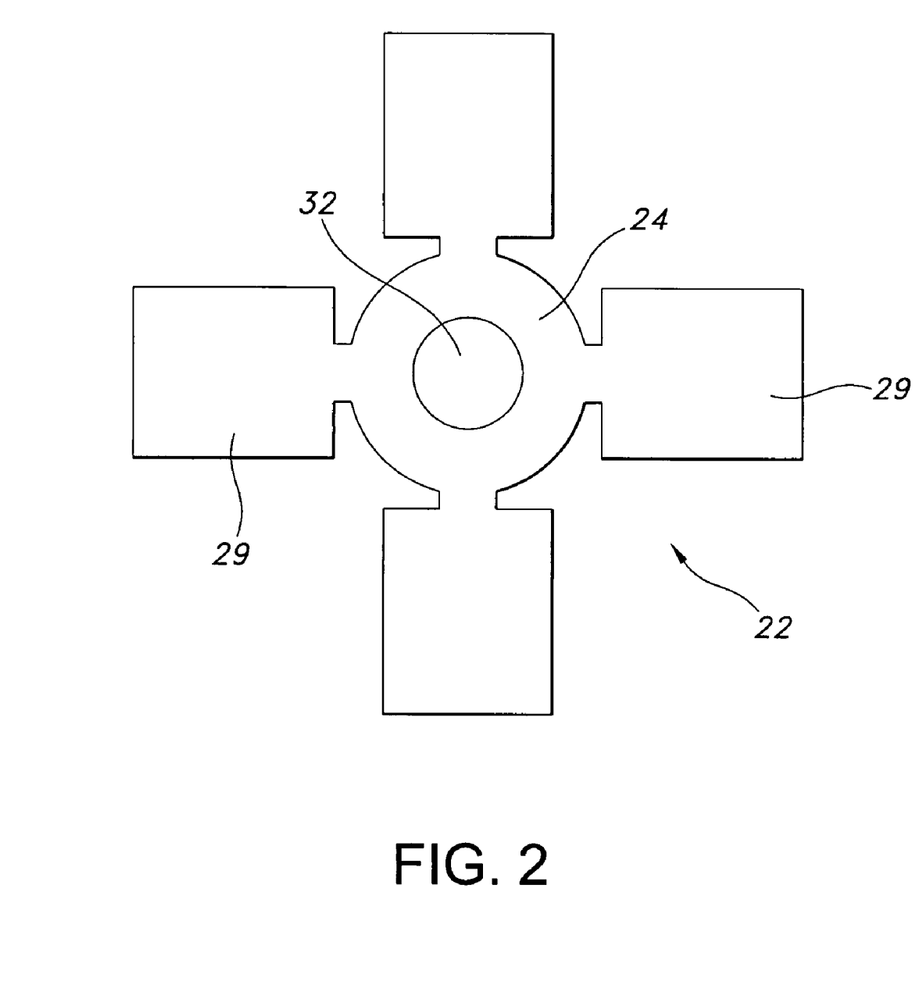
FIGS. 2, 3 and 4 show front, side and perspective views, respectively, of the first stage of manufacture of the connector of the present invention.
Figure 3:
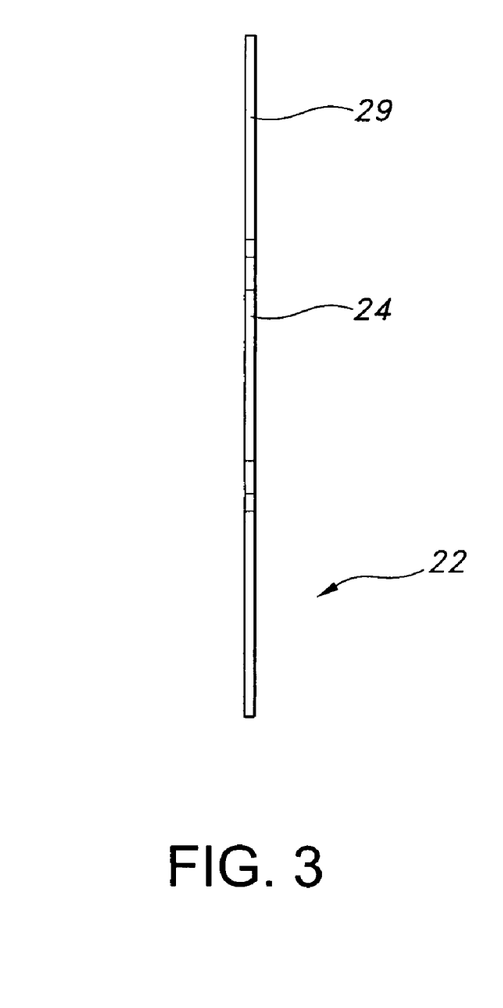
Figure 4:
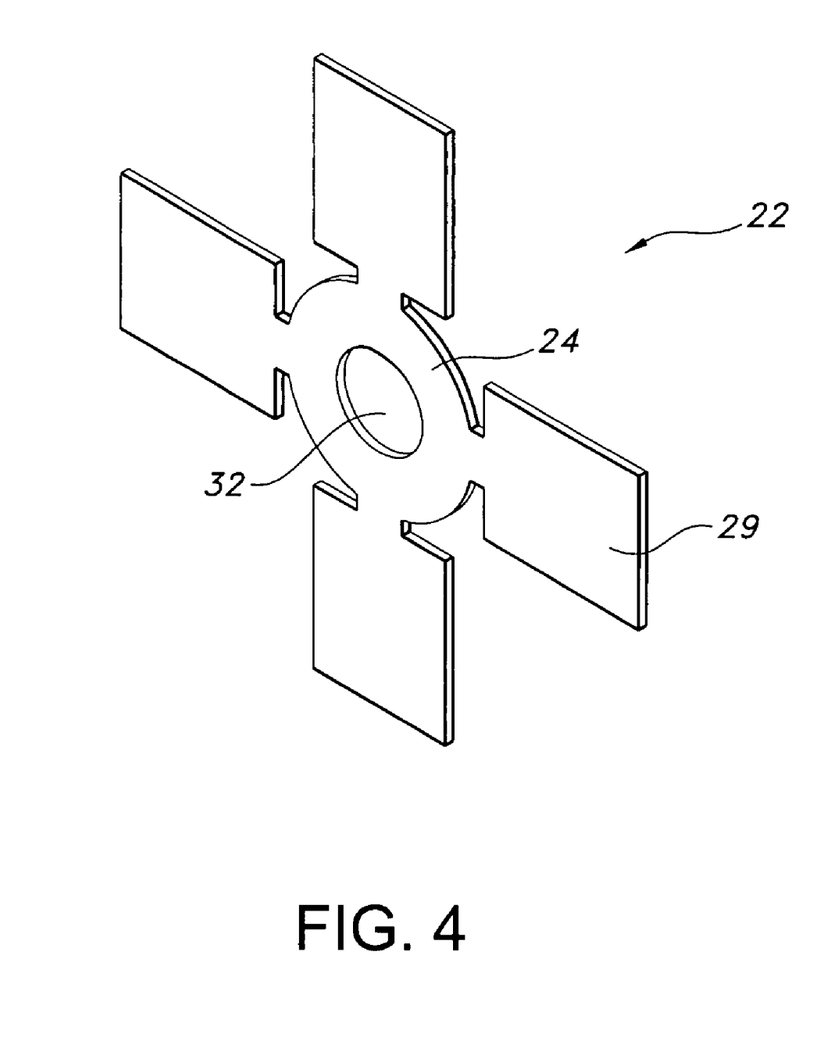

Referring to FIGS. 2 through 4, the first stage of manufacture is shown. Connector body 22 is formed from flat metal blank and is stamped to have the shape shown in FIG. 2 which includes the forward end 24 defining a circular member having a plurality of radially extending side walls 29 which, as will be described in further detail hereinbelow, are used to form cylindrical wall 28. Conventional stamping techniques may be used to form the configuration shown in FIGS. 2–4.

Figure 5:
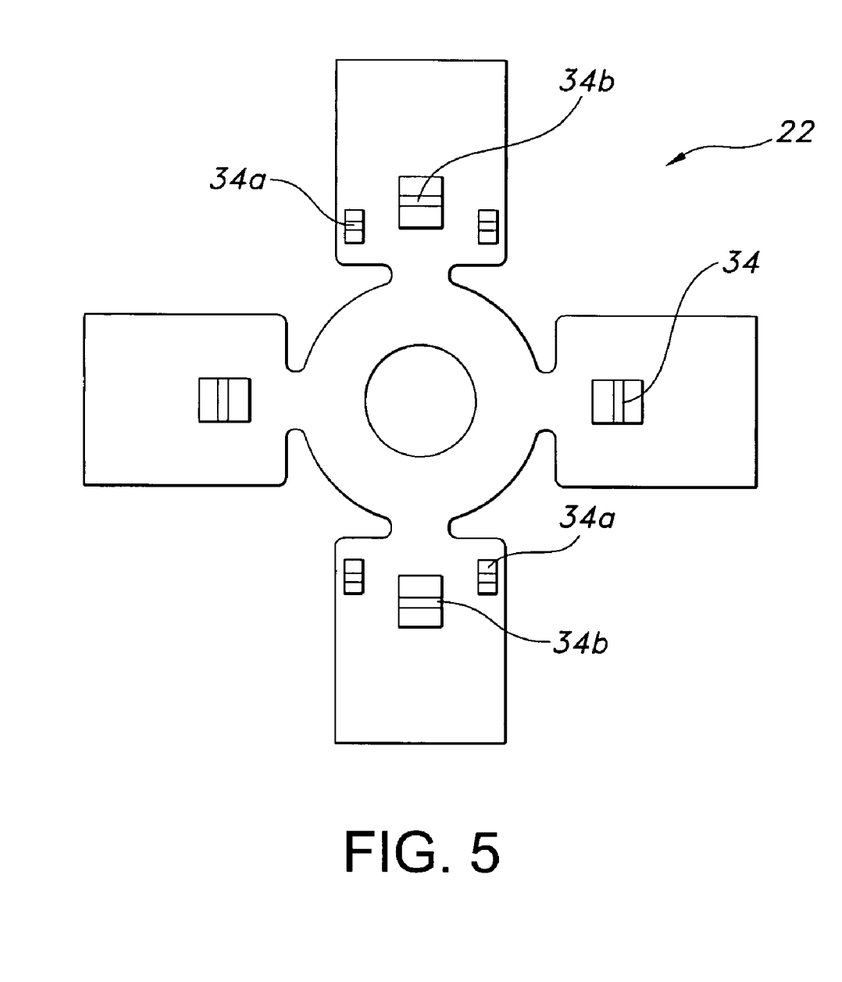
FIGS. 5, 6 and 7 show front, side and perspective views, respectively, of the second stage of manufacture of the connector of the present invention.
Figure 6:
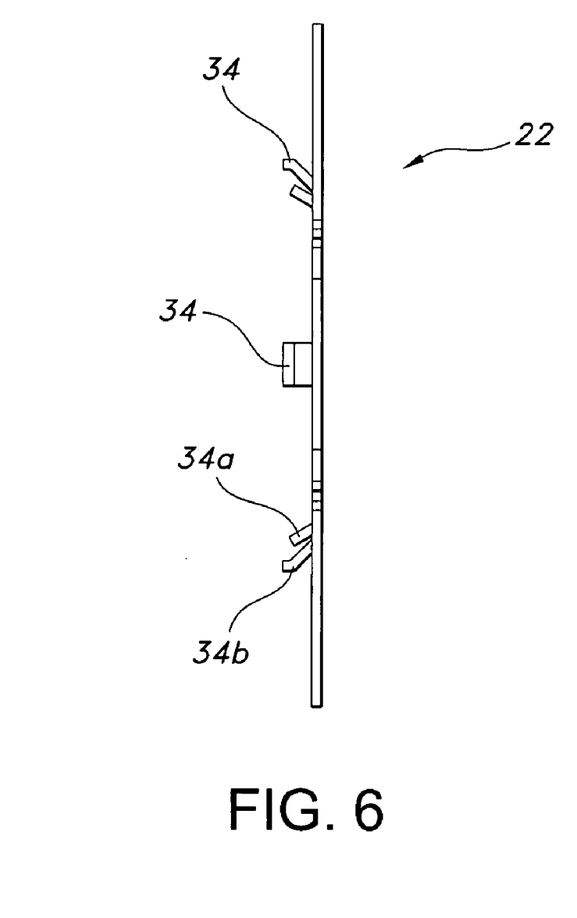
Figure 7:
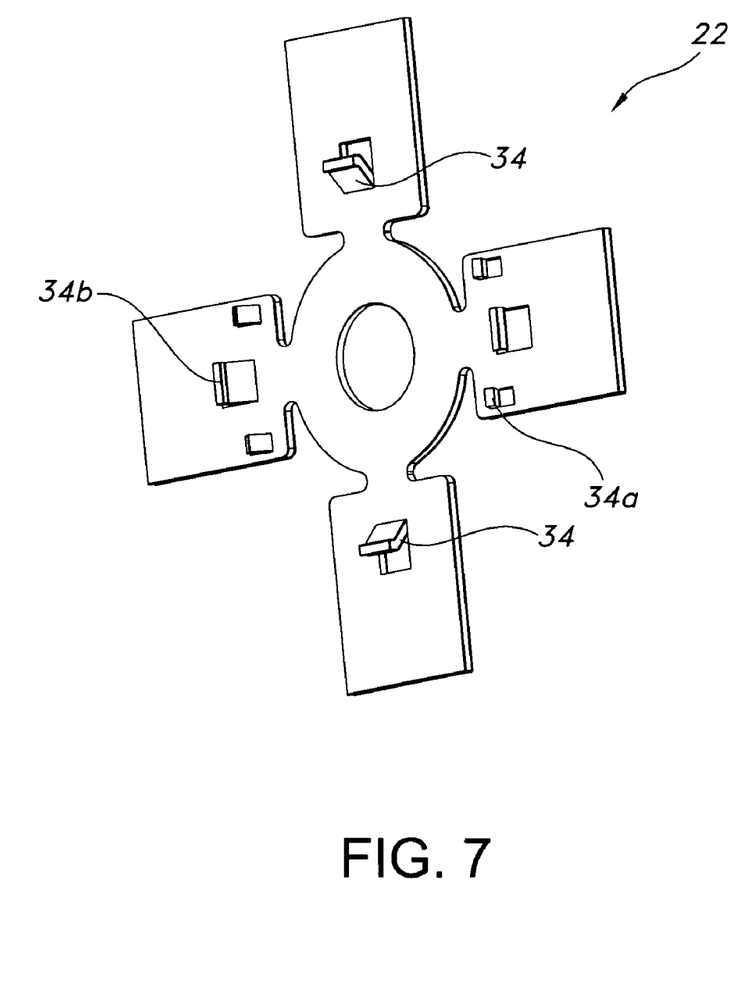
Figure 8:
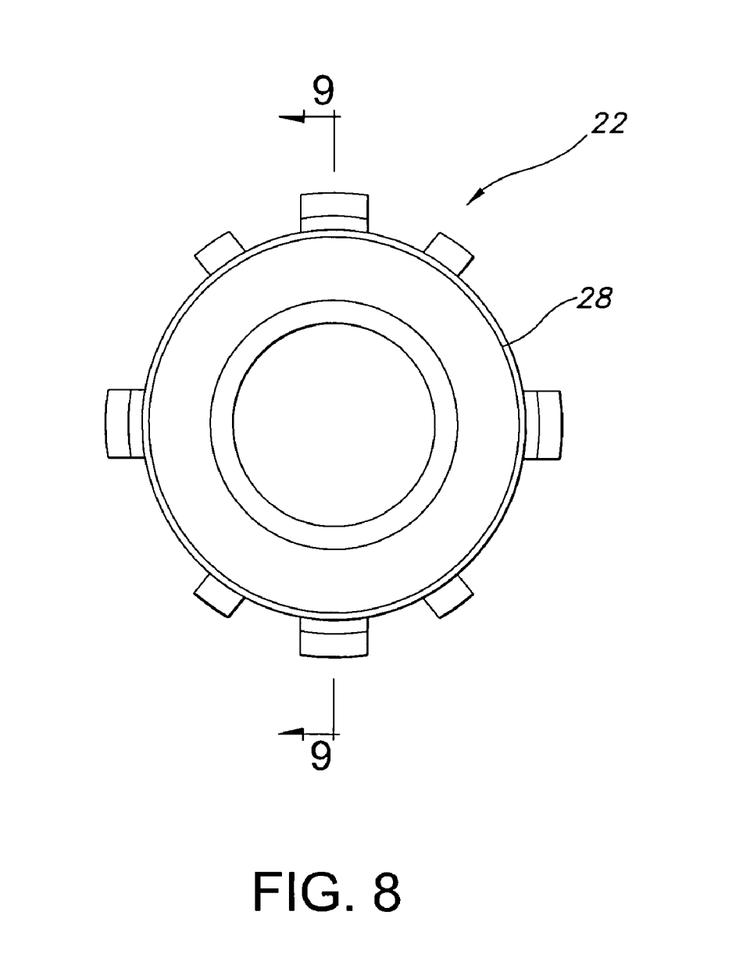
FIGS. 8, 9, 10, 11, 12, and 13 show front, side sectional, rear side, front perspective and rear perspective views, respectively, of the third stage of manufacture of the connector of the present invention.
Figure 9:
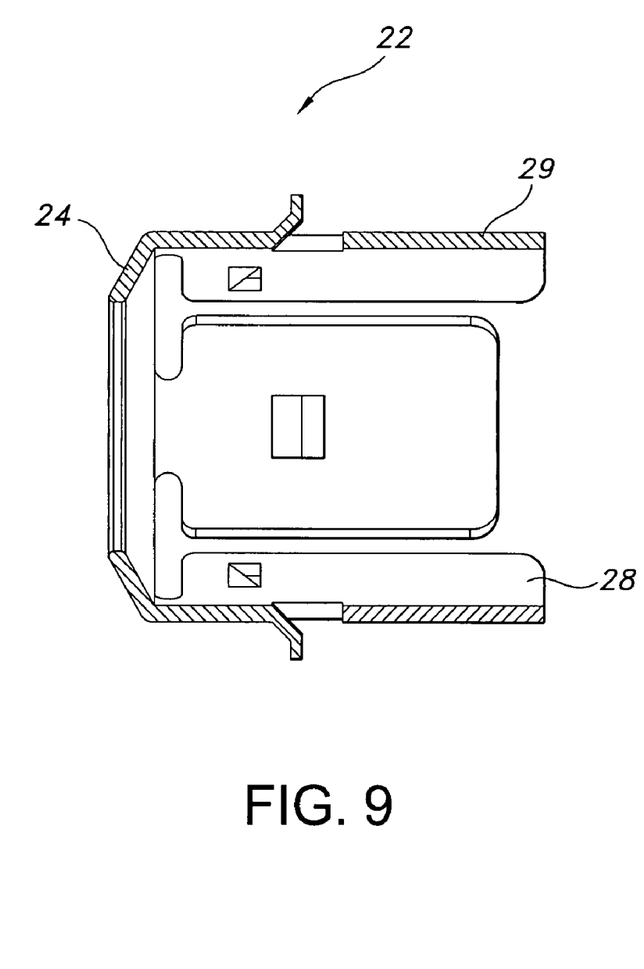
Figure 10:
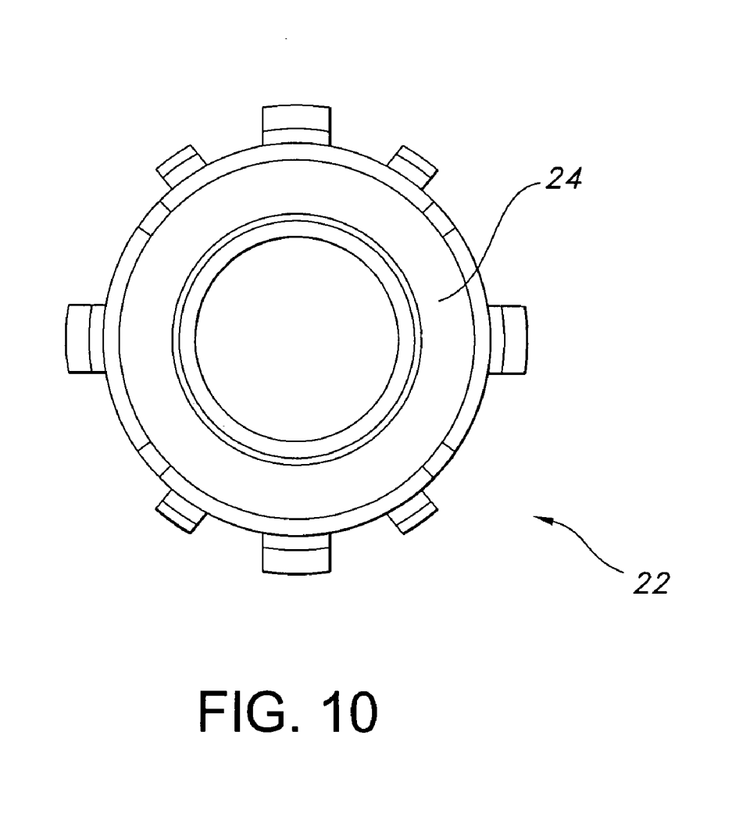
Figure 11:
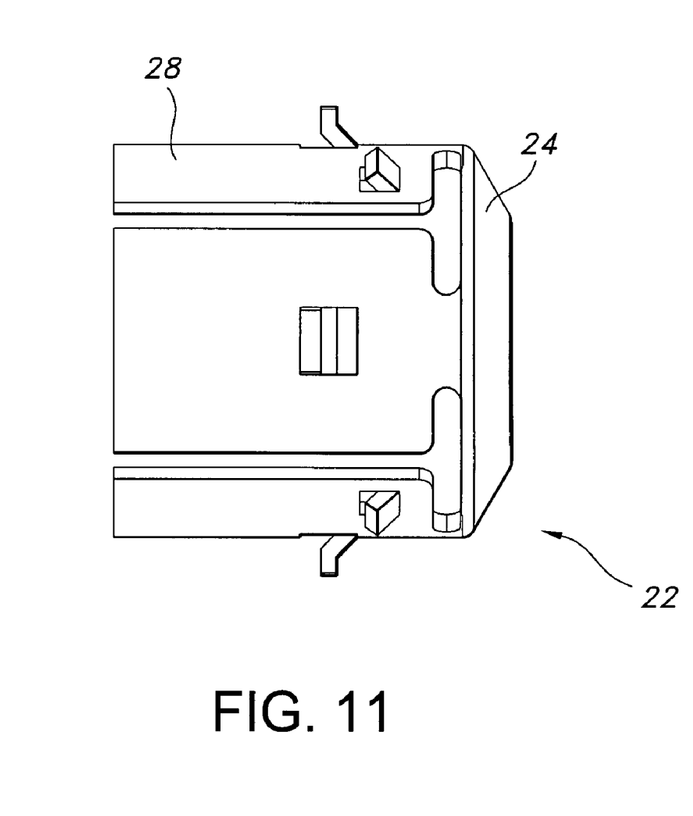
Figure 12:
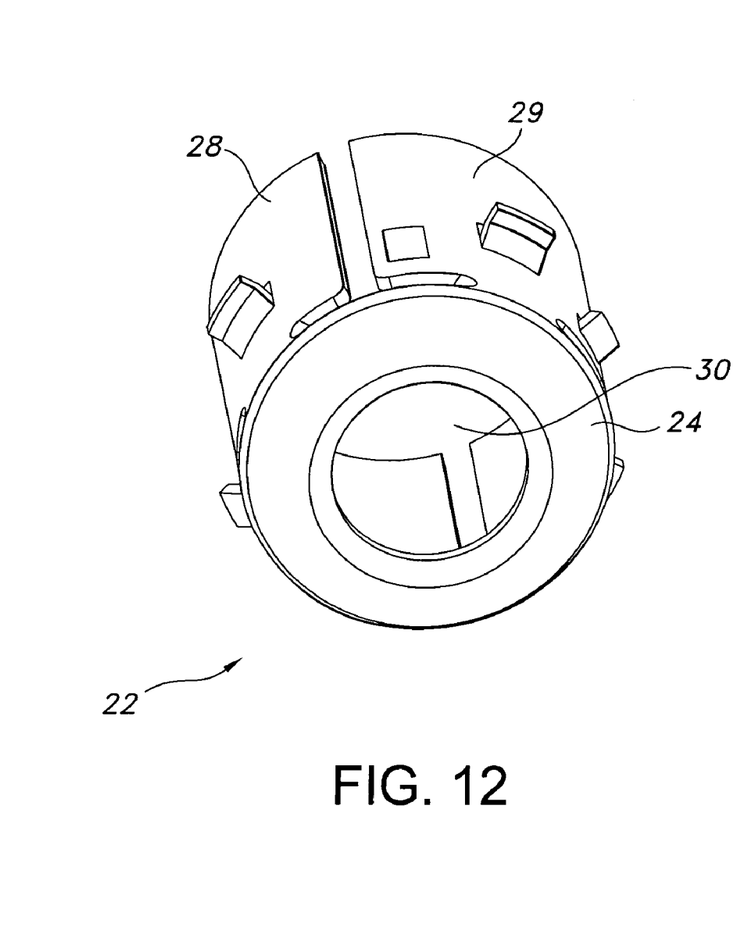
Figure 13:
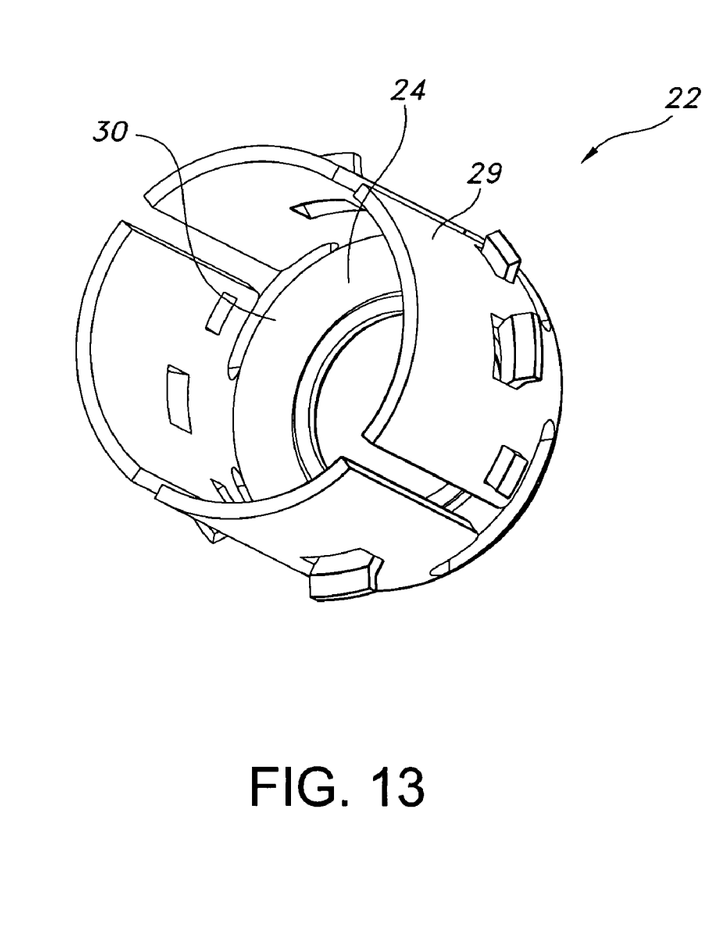

The second stage of manufacture of the connector of the present invention is shown in FIGS. 5–7. Each of the side walls 29 are further stamped to form extending tabs 34 including front tabs 34a and rear tabs 34b. These tabs may be punched out from the flat blank in conventional fashion.

The third stage of manufacture of the connector 10 of the present invention is shown in FIGS. 8–13. The side walls 29 are bent to place them generally perpendicular to the forward end 24 so that the side walls 29 collectively form cylindrical wall 28. This is more fully shown in the perspective views of FIGS. 12 and 13. The side walls 29 are both deflected about forward end 24 and slightly curved to form the overall cylindrical configuration. This also defines the cylindrical connector interior 30. As constructed, in the position shown in FIGS. 12 and 13, it may be appreciated that the side walls 29 are deflectably cantilevered from the forward end 24.

Figure 14:
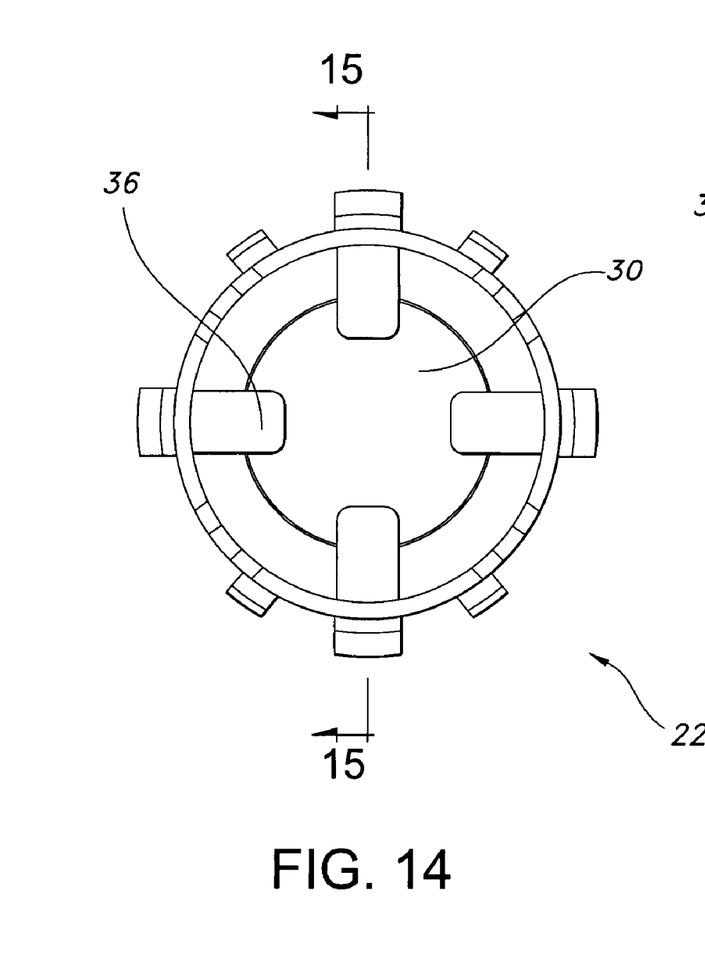
FIGS. 14 and 15 show rear and side views, respectively, of the fourth stage of manufacture of the connector of the present invention.
Figure 15:
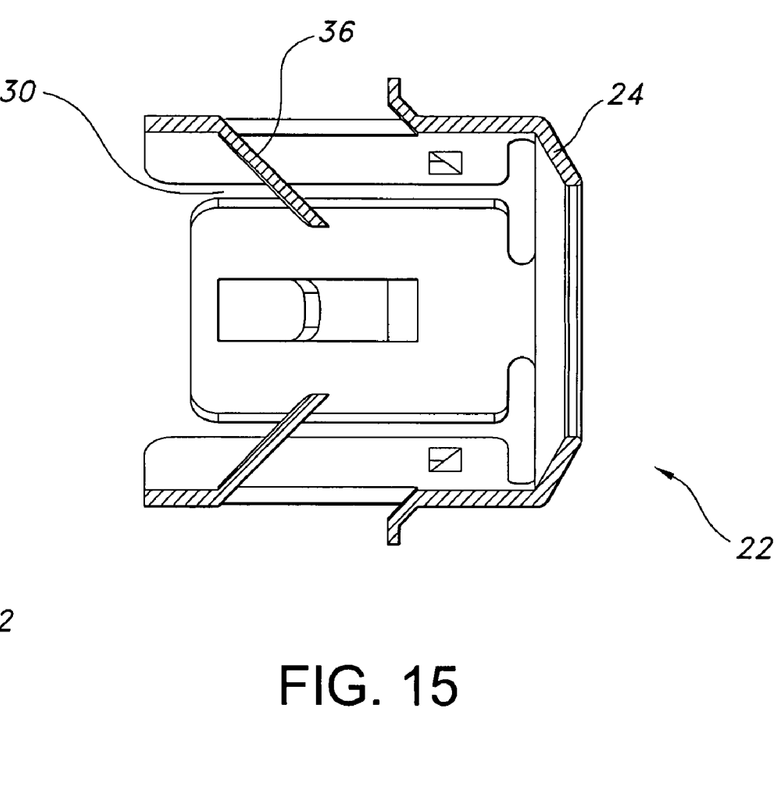
Figure 16:
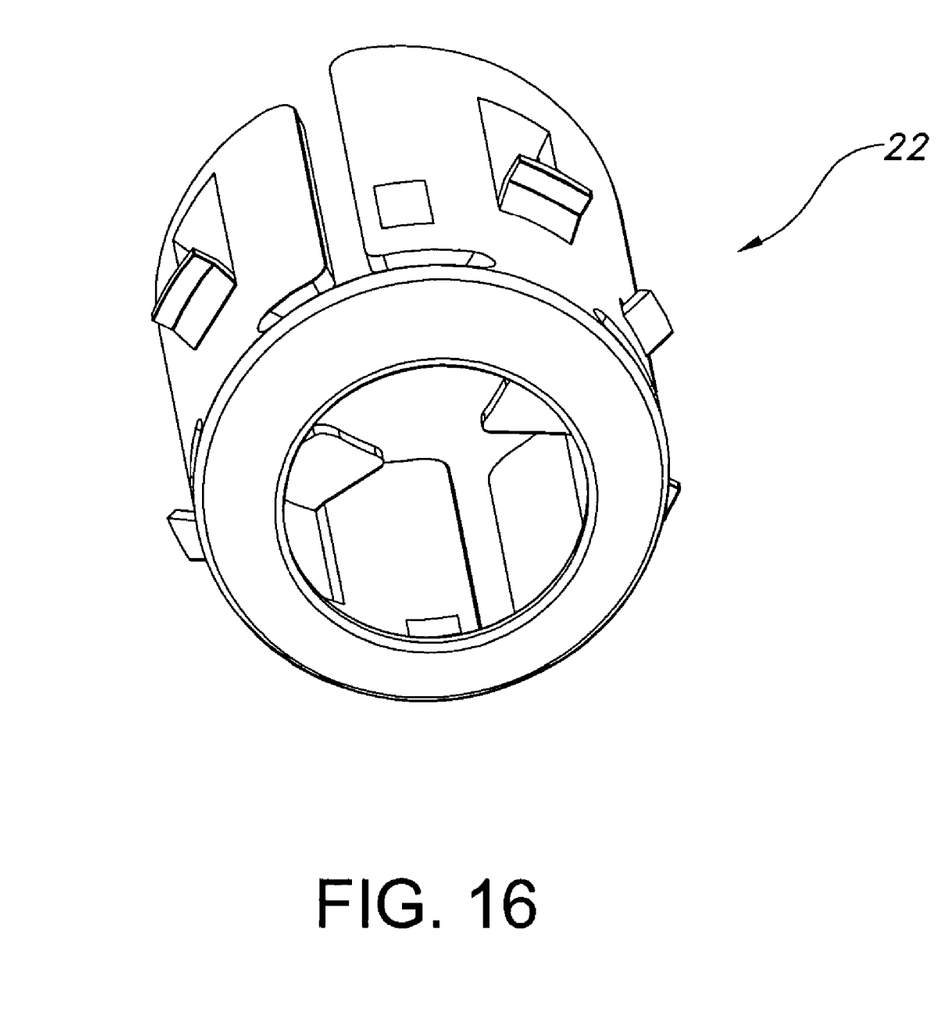
FIGS. 16 and 17 show front and rear perspective showings, respectively, of the finished connector of the present invention.
Figure 17:
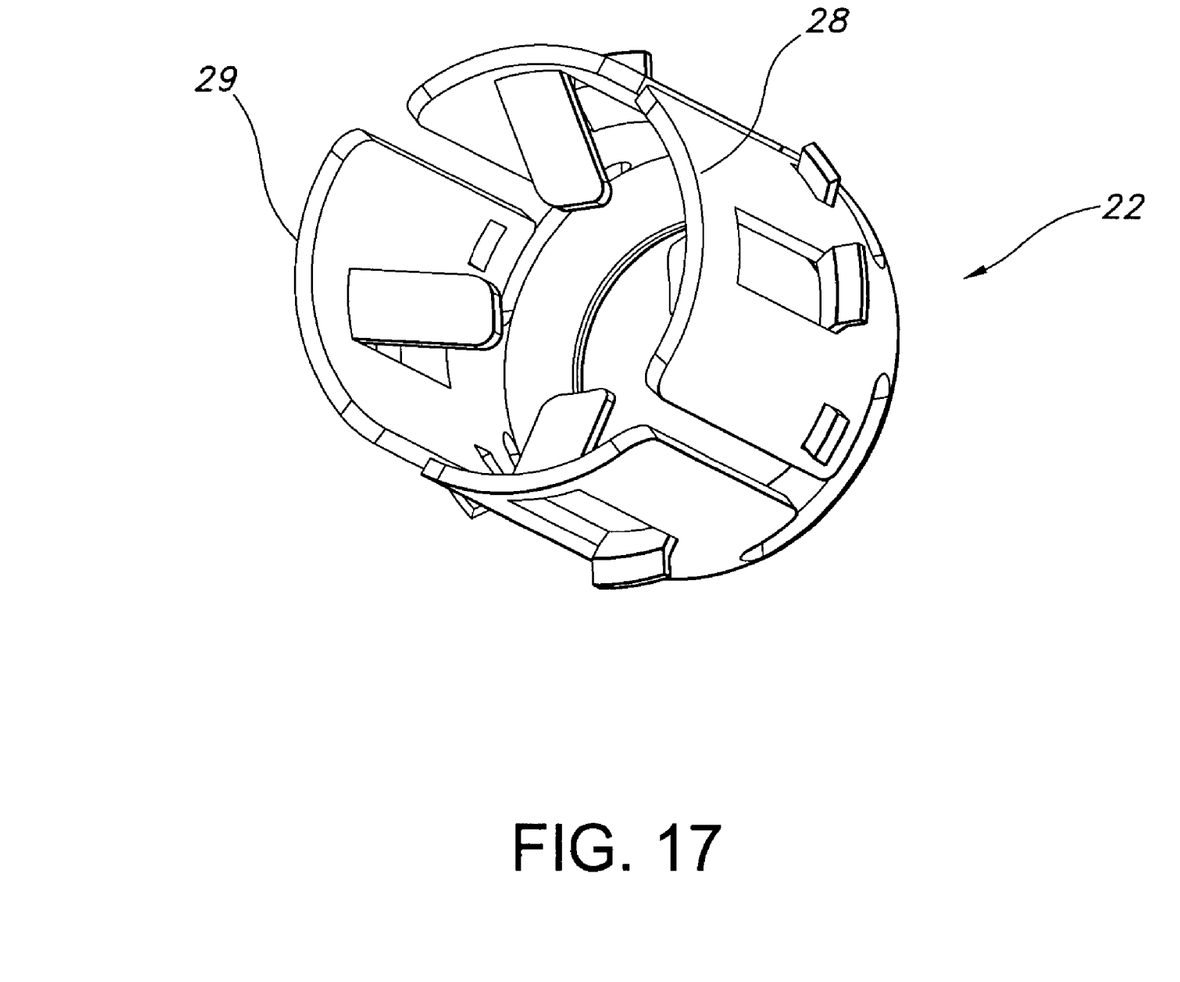
Figure 18:
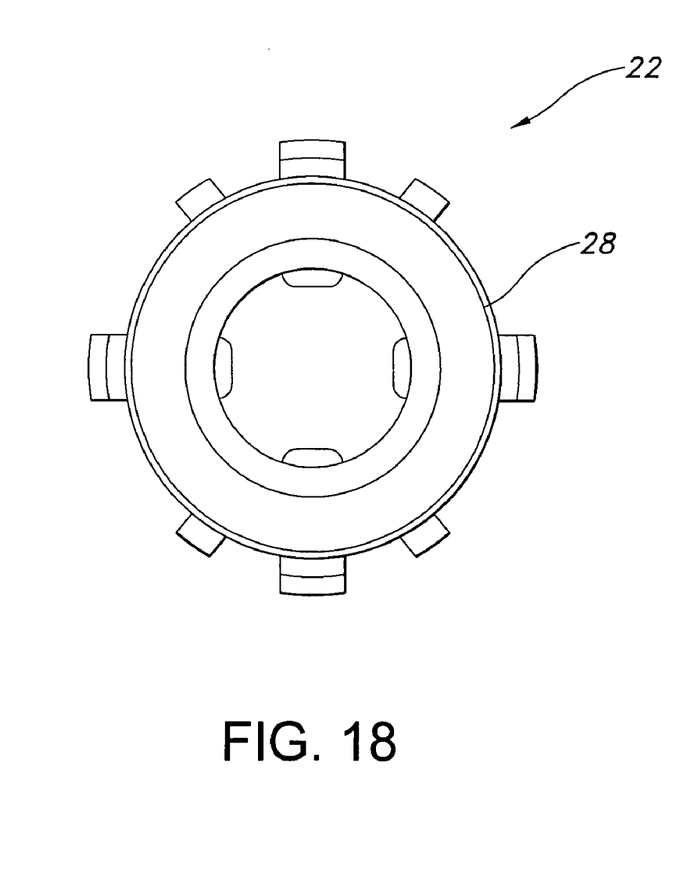
FIGS. 18 and 19 show front and side elevational showings of the finished connector of the present invention.
Figure 19:
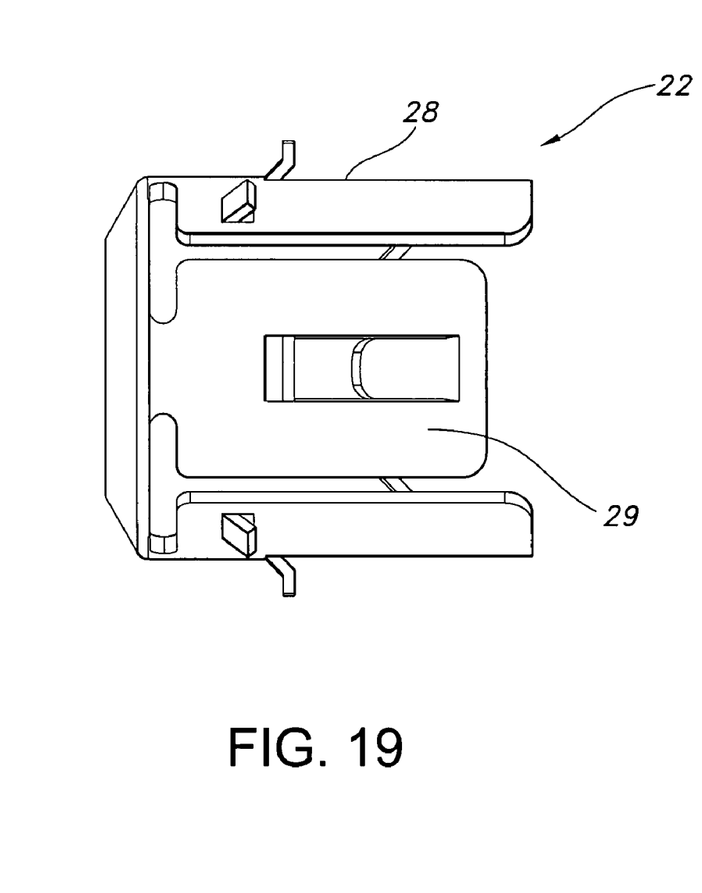

The fourth stage of manufacture of connector 10 is shown with respect to FIGS. 14 and 15 where the inwardly directed fingers 36 are formed in each side wall 29. The fingers 36 extend into the interior 30 of connector 10 for engagement with the armored cable 12 (FIG. 1).

The finished connector body 22 is shown in FIGS. 16–19. The body 22 is formed for use into a generally cylindrical shape. The side walls 29 form the cylindrical wall 28.

Figure 20:
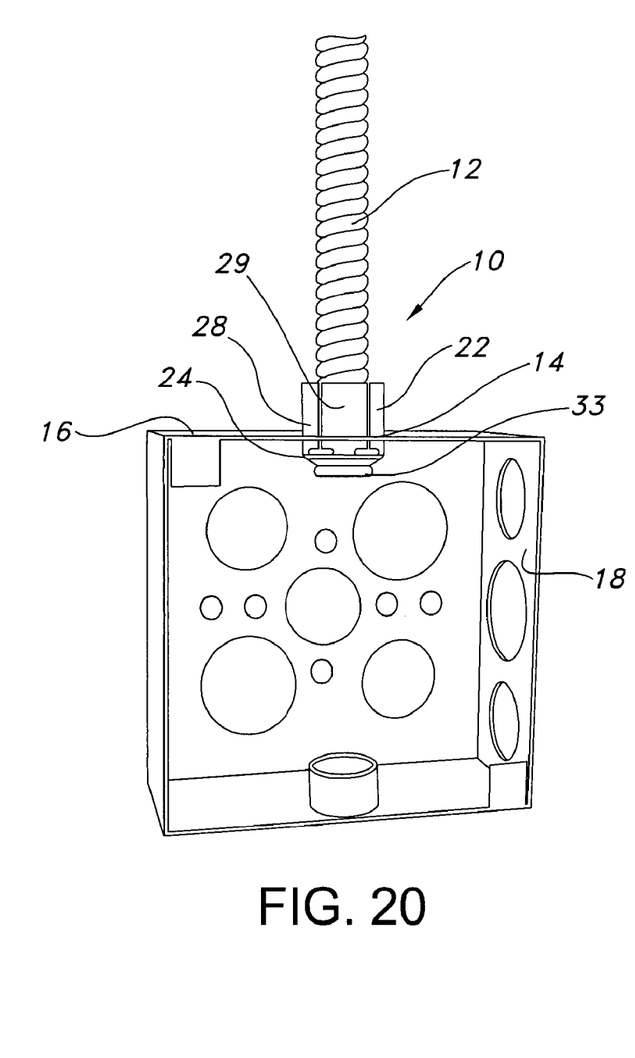
FIG. 20 shows the connector of the present invention supported in an electrical box.
Figure 21:
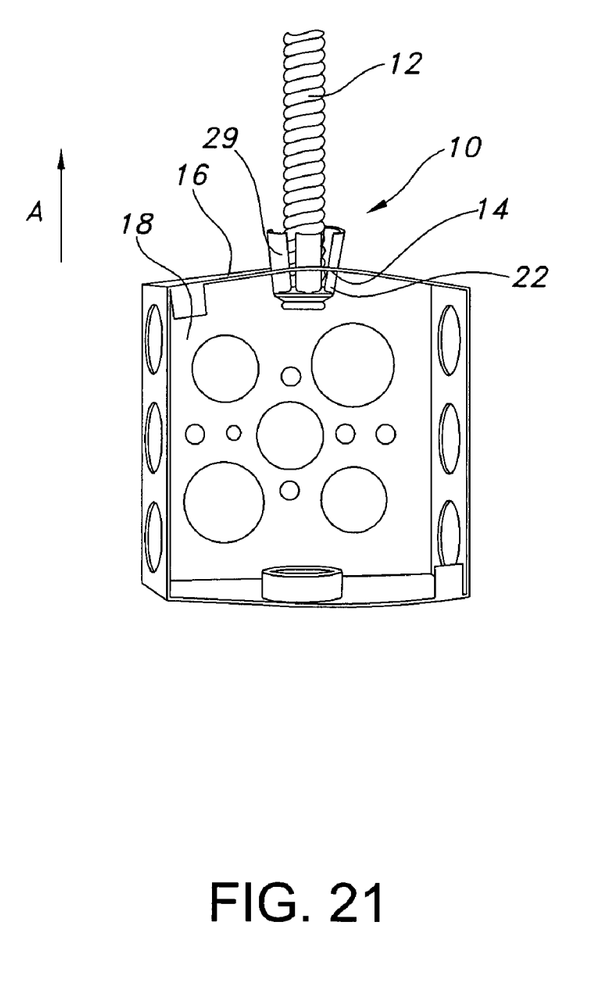
FIG. 21 shows the connector of FIG. 20 with a pull out load placed thereon.

Having described the manufacturer of the connector body 22 of the present invention, its use may be seen with respect to FIGS. 20 and 21.

It is contemplated that the connector body 22 formed in its final configuration as shown in FIG. 1 and having insulated throat 33 applied to the forward end 24 thereof may be inserted into the knockout 14 of electrical enclosure 18. The cylindrical wall 28 inwardly deflects to allow insertion into the knockout 14. Front tabs 34a pass through the knockout so that the front tabs 34a abut against the inside surface of wall 16 while the rear tabs 34b abut against the outside surface of wall 16. Since the side walls 29 are deflectable in a cantilevered fashion from forward end 24, such insertion is permitted.

Thereafter, armored cable 12 may be inserted into the interior 30 of connector 10. Inwardly directed fingers 36 make engagement with the helical grooves 12a. Insertion of the cable 12 into the interior 30 of connector 10 serves to expand the cantilevered side walls 29 so that secure engagement is made between the connector 10 and the enclosure 18. This secures the connector to the enclosure and the cable to the connector. Electrical continuity is established between the armored cable 12 and the metallic enclosure 18 by virtue of the forwardly directed fingers 36 and the extending tabs 34.

As may be appreciated, the connector 10 of the present invention is securely retained to cable 12 in the knockout 14 of the electrical enclosure 18. Not only does the present invention establish electrical continuity between the armored cable 12 and the enclosure 18 but also provides for strain relief of the cable attached to the electrical enclosure such that when a load is placed on the cable tending to pull the cable from the enclosure 18, the connector securely retains the cable in the knockout of the electrical enclosure.

Referring now to FIG. 21, the effect of a pullout load placed on the cable 12 is shown.

It is contemplated that a load placed on cable 12 in the direction of arrow A will cause the inwardly directed fingers 36, which are seated in the groove 12a of the cable 12 (FIG. 1), to inwardly deflect into tighter engagement with the cable. As the fingers 36 are seated between adjacent raised convolutional 12b of cable 12, a withdrawal force in the direction of arrow A will urge the fingers 36 further into the cable 12. This in turn causes limited outward deflection of the side walls 29. Continued outward deflection of the side walls 29 is limited by the secure positioning of the connector 10 in knockout 14 of enclosure 18.

Thus, upon continued application of the pull out force, the cable 12 will be maintained in mechanical and electrical engagement with the connector 10. The force of the load is thereby transferred from the connector to the wall 16 of the enclosure 18 which results in the bowing of the wall.

Various changes to the foregoing described and shown structures will now be evident to those skilled in the art. Accordingly, the particularly disclosed scope of the invention is set forth in the following claims.

What is claimed is:

1. A cable connector for terminating an end of a cable in a knockout in a wall of an enclosure comprising:
   a one-piece connector body having a forward end and a plurality of side walls extending from said forward end in cantilevered fashion to form a cavity for receipt of an end of said cable, said side walls including a set of first outwardly extending tabs which are insertable through said knockout upon said insertion for engagement with one side of said wall of said enclosure;
   said forward end of said connector body being insertable into said knockout, with said cantilevered side walls being deflectable to permit said insertion;
   said side walls further accommodating insertion of said cable end into said cavity for retentively supporting said cable to said enclosure.

2. A cable connector of claim 1 wherein said side walls include inwardly extending fingers for engaging said cable.

3. A cable connector of claim 2 wherein said inwardly extending fingers are from struck said side walls.

4. A cable connector of claim 1 wherein said side walls include a set of second tabs spaced from said first tabs and which are engageable with the other side of said wall of said enclosure.

5. A cable connector of claim 4 wherein said set of first and second tabs are struck from said side walls.

6. A cable connector of claim 1 wherein said cable is an armored cable having a helical grove thereabout and wherein said inwardly extended fingers are engageable with said helical groves upon insertion of said armored cable into said cavity.

7. A cable connector of claim 1 wherein said connector body is formed of a conductive material.

8. A connector body of claim 7 wherein said conductive material is metal.

9. A connector of claim 1 wherein said side walls of said connector are outwardly pivotable upon application of a pullout load on said cable.

10. A connector of claim 9 wherein said inwardly extending fingers are further engageable with said cable upon said outwardly pivotable movement of said side walls.

11. In combination:
an electrical enclosure having a knockout opening in a wall thereof and a cable connector supported in said knockout opening, said cable connector comprising:
a one piece connector body having a forward end insertably positioned in said knockout and a plurality of cantilevered side walls extending from said forward end to form a cavity for receipt of an end of an electrical cable;
said side walls being deflectably engageable with said cable upon insertion of said cable into said knockout opening, wherein said side walls include a set of first tabs which are insertable through said knockout upon said insertion for engagement with one side of said wall of said enclosure.

12. A cable connector of claim 11 wherein said side walls include outwardly extending tabs for engaging said wall of said enclosure about said knockout.

13. A cable connector of claim 11 wherein said side walls include inwardly extending fingers for engaging said cable.

14. A cable connector of claim 13 wherein said side walls include a set of second tabs spaced from said first tabs and which are engageable with the other side of said wall of said enclosure.

15. A cable connector of claim 14 wherein said set of first and second tabs are struck from said side walls.

16. A cable connector of claim 13 wherein said inwardly extending fingers are from struck said side walls.

17. A cable connector of claim 11 wherein said cable is an armored cable having a helical grove thereabout and wherein said inwardly extended fingers are engageable with said helical groves upon insertion of said armored cable into said cavity.

18. A cable connector of claim 11 wherein said connector body is formed of a conductive material.

19. A connector body of claim 18 wherein said conductive material is metal.

20. A connector of claim 11 wherein said side walls of said connector are outwardly pivotable upon application of a pullout load on said cable.

21. A connector of claim 20 wherein said inwardly extending fingers are further engageable with said cable upon said outwardly pivotable movement of said side walls.

* * * * *